United States Patent Office 3,600,152
Patented Aug. 17, 1971

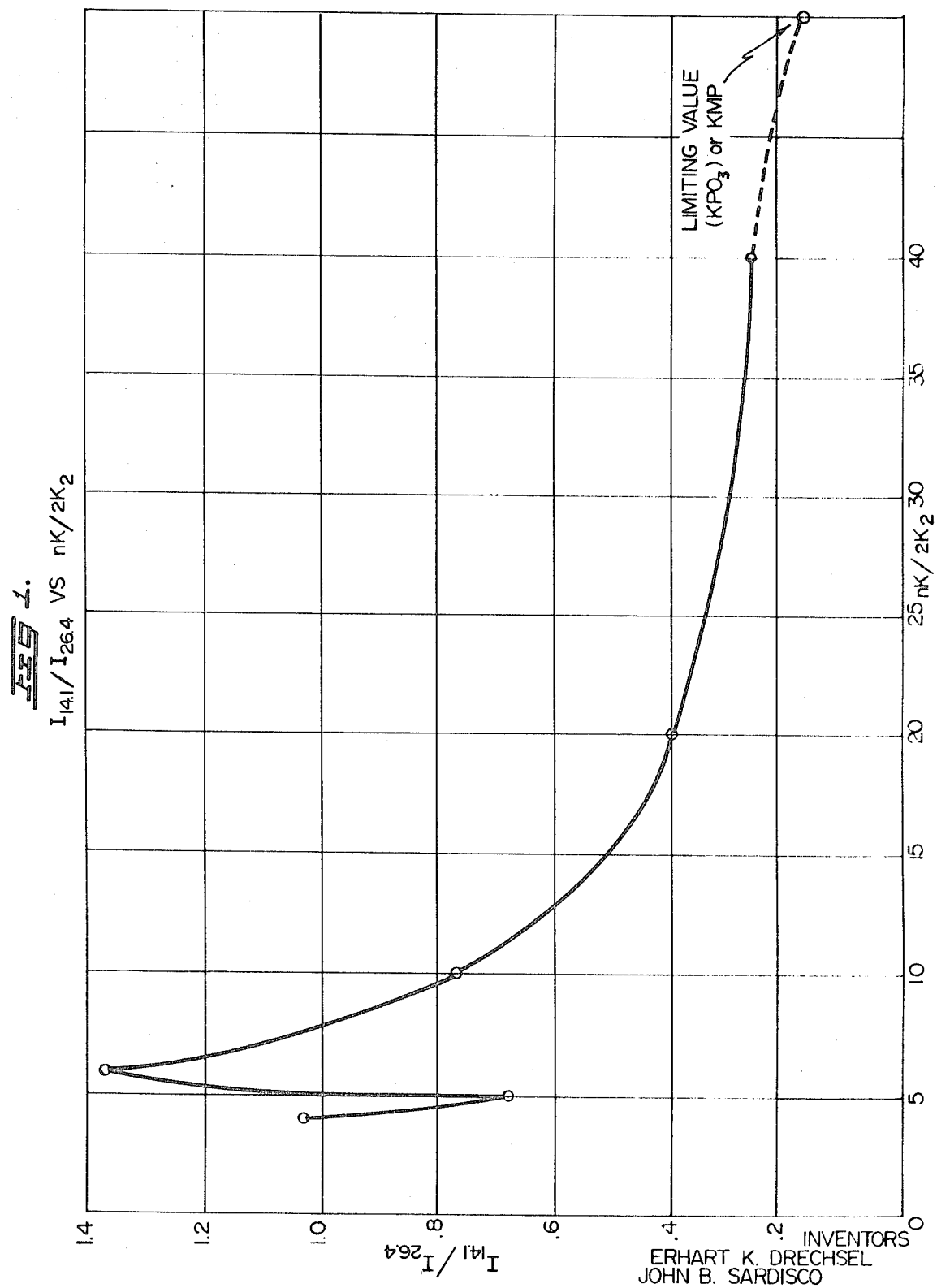

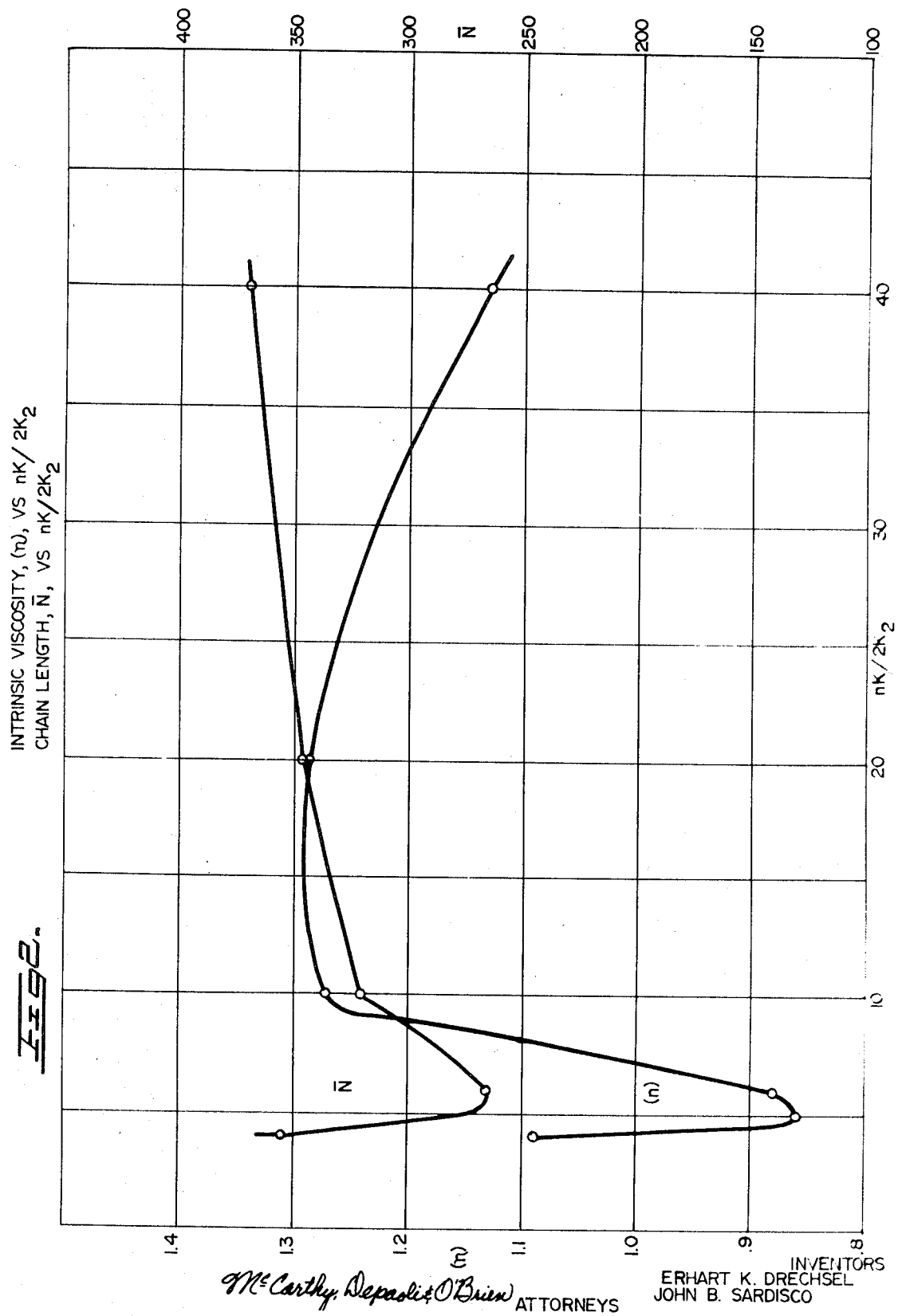

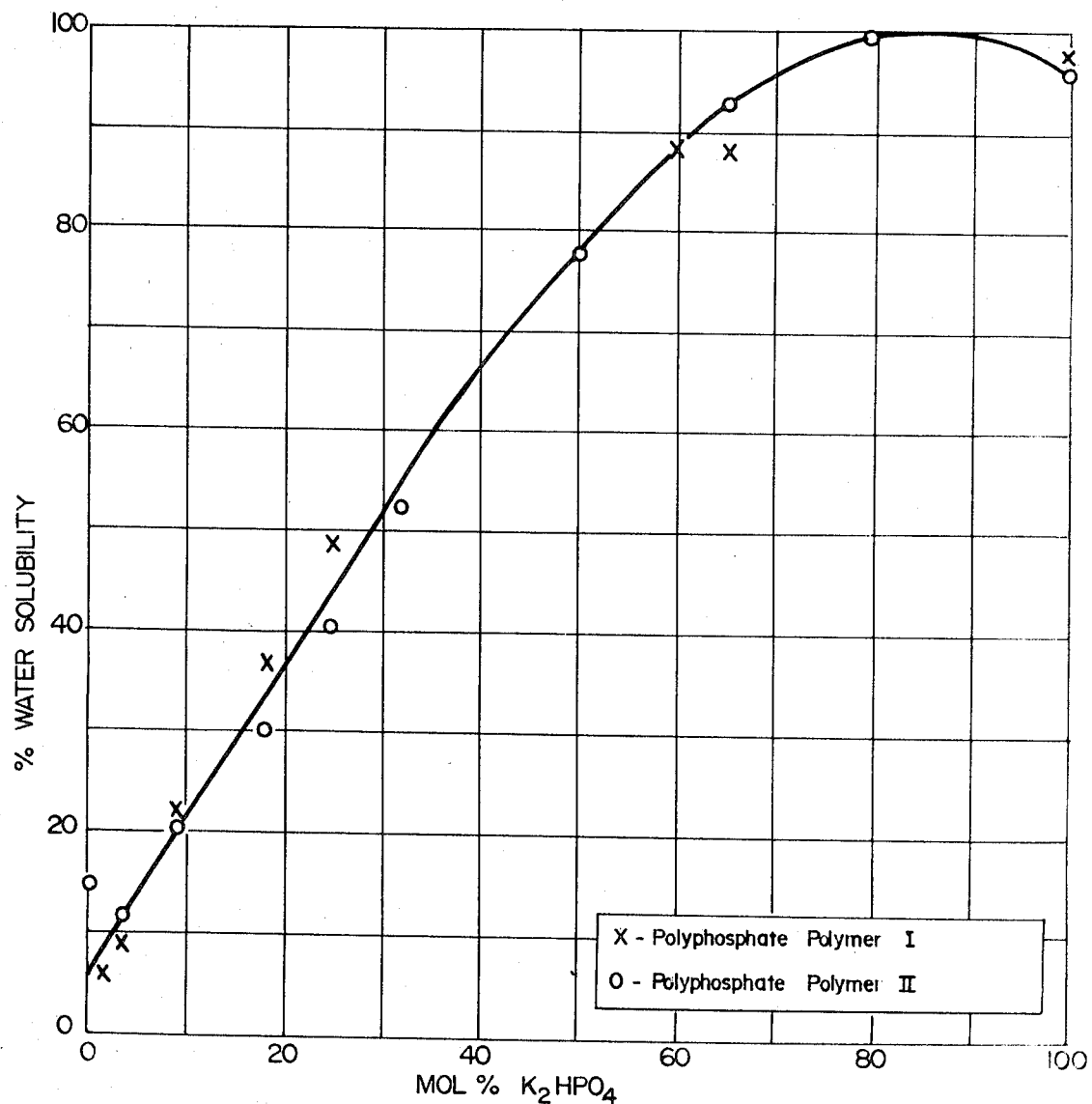

3,600,152
PHOSPHATE FERTILIZER PRODUCTS
Erhart K. Drechsel, Tucson, Ariz., and John B. Sardisco, Shreveport, La., assignors to Pennzoil United, Inc., Shreveport, La.
Filed Aug. 27, 1968, Ser. No. 755,699
Int. Cl. C05b 7/00
U.S. Cl. 71—34
10 Claims

ABSTRACT OF THE DISCLOSURE

Fertilizer products having controlled water solubilities and molecular weights which comprise polymeric reaction products of potassium dihydrogen phosphate and potassium monohydrogen phosphate having molecular weights of about 20,000 to 80,000, produced in the temperature range of 250 to 850° C. The products are unique in that the solubility in water can be predetermined and controlled by regulation of the reactant amounts and reaction conditions. The potassium dihydrogen phosphate and potassium monohydrogen phosphate mixtures are produced by mixing or the mixtures may be produced by a reaction of phosphate rock and/or derivatives thereof with phosphoric acid or mixtures thereof with sulfuric acid and potassium bisulfate and/or potassium sulfate. There is also disclosed a potassium polyphosphate designated potassium anhydrophosphate of varying water solubility and molecular weight. These product mixtures exhibit excellent solubility properties for use as controlled-release fertilizer materials.

BACKGROUND OF THE INVENTION

Field of the invention

This invention relates to new fertilizer products approaching 100% plant food values, to methods for their preparation and to procedures for their use as fertilizer products.

Description of the prior art

A large number of materials have been proposed for use as plant foods in the fertilizer industry. Among such fertilizers which may be used are the so-called "controlled-release" fertilizers which comprise fertilizer materials that will be released slowly over extended periods of time so as to provide plant nutrients continuously during plant growth.

Two principal approaches have been employed heretofore to control the rate of dissolution of such fertilizers when applied to the soil. These have been by use of slowly soluble polymeric compounds such as those sold under the trade name Ureaform (urea-formaldehyde compounds) or by coating the fertilizer pellets with relatively insoluble, impervious materials. Such fertilizer materials which have controlled rates of dissolution have several advantages over untreated fertilizer compositions as they greatly reduce leaching of the fertilizer in the soil such as by excess rainfall, minimize luxury consumption of the fertilizer by the plant, lower toxicity to seedlings or plants due to salt concentration and decrease other losses of fertilizer values. On the other hand, when untreated water-soluble fertilizer materials are applied to the ground, many of the nutrient values are carried away by the natural or artificial ground drainage and wasted insofar as useful contribution to the growth of the crop which they are applied to is concerned.

The Ureaform type compounds and coated pellets do not provide 100% plant food values. It is extremely desirable therefore to provide a fertilizer composition other than the Ureaform type or those having insoluble shields thereon, which can be used in its natural form and which will inherently operate to provide delayed dissolution or water-proofing, and thus provide necessary fertilizer values for plants over extended periods. This has obvious advantages particularly from the standpoint of reducing the costs of production in that the use of inert materials to provide the water-proofing shield are obviated. Moreover, the costs of producing such materials is reduced. Furthermore, fertilizers are obtained which will have essentially 100% plant food values. Therefore a distinct need remains in the art for methods by which such fertilizer materials can be produced and used as plant food values over extended periods of time.

The art also teaches that various potassium phosphate compounds such as potassium dihydrogen phosphates, potassium monohydrogen phosphate, potassium polyphosphates and potassium metaphosphate as well as other potassium compounds are useful as fertilizers as they provide nearly 100% plant food values.

The polyphosphates in particular have been studied a great deal in this area as by their use, a high analysis fertilizer is obtained. However, use of the polyphosphates alone has not been satisfactory as fertilizers since none of the various compounds provide suitable solubility characteristics, being generally too soluble or too insoluble.

Fertilizer products of the phosphate type are generally considered advantageous for a number of reasons, even to the extent that the polyphosphates are considered superior to the orthophosphates as plant food sources. For example, as pointed out in an article by Campbell and Ulmer entitled "The Role of Polyphosphates in Fertilizer" appearing on page 25 in the March 1968 issue of Croplife Magazine, the highest practical analysis of liquid fertilizer using orthophosphates is 8–24–0 (N–P–K), whereas with ployphosphates, a 10–34–0 liquid fertilizer is obtainable. Numerous other advantages of the polyphosphate-type products are set forth in the above noted article.

Another factor in the use of the polyphosphate materials known to the prior art however, is also documented in the article from Croplife Magazine. This factor is that, while materials of this type should exist longer in soils than conventional fertilizers, there is no evidence as to how rapidly such compounds decompose in the soil, and more importantly, how such decomposition can be controlled, other than the shielding technique mentioned above.

The art also teaches that potassium dihydrogen phosphate and potassium monohydrogen phosphate and their mixtures can be utilized as fertilizers to provide plant foods high in phosphorous and potassium content. Moreover, the art teaches that certain polymeric products are obtained when these materials are reacted together at temperatures ranging from about 200 to 400° C. In an article by Osterheld and Audrieth entitled "Polymerization and Depolymerization Phenomena in Phosphate-Metaphosphate Systems at Higher Temperatures Condensation Reactions Involving the Potassium Hydrogen Orthophosphates," Journal of Physical Chemistry, volume 56, pages 38–42 (1952), a number of reactions of potassium dihydrogen phosphate, $KH_2PO_4$, and potassium monohydrogen phosphate, $K_2HPO_4$, are presented wherein molar ratios of 2:1, 2:2, 3/2:2 and 1:2 respectively, are employed to prepare compounds identified as potassium metaphosphate, $KPO_3$, and potassium tripolyphosphates, $K_5P_3O_{10}$, as well as other phosphorus compounds. In the conclusions to this article, the authors postulate that at least three reactions are involved. According to the authors, the preferred first reaction in any mixture containing $KH_2PO_4$ and $K_2HPO_4$ occurs at 245° C. and conforms to the following equation:

$$KH_2PO_4 + K_2HPO_4 \rightarrow K_3HP_2O_7 + H_2O$$

Further heating of the reactants then leads to other products depending upon the mole ratios of the reactants. If $K_2HPO_4$ is present in excess, heating at higher temperatures (about 325° C.) results in the formation of potassium tripolyphosphate in accordance with the following equation:

$$K_3HP_2O_7 + K_2HPO_4 \rightarrow K_5P_3O_{10} + H_2O$$

On the other hand, if $K_2HPO_4$ is not present in excess at this temperature, a slightly increased temperature causes condensation of two moles of $K_3HP_2O_7$ to give the tetraphosphate as a possible intermediate, the latter disproportionating to the tripolyphosphate and metaphosphate according to the following equation:

$$2K_3HP_2O_7 \longrightarrow (K_6P_4O_{13}) + H_2O$$
$$\longrightarrow K_5P_3O_{10} + KPO_3$$

In one of these prior art disclosures however, are procedures set forth by which products resulting from the reaction of potassium dihydrogen phosphate, $KH_2PO_4$, and potassium monohydrogen phosphate, $K_2HPO_4$, can be utilized as fertilizers to obtain maximum plant food values and particularly as fertilizers which remian available in the soil over extended periods of time. Moreover, the art does not teach that product mixtures can be obtained by the reaction of potassium dihydrogen phosphate and potassium monohydrogen phosphate which will vary in water solubility and molecular weights as the ratio of the components in the mixture vary. Further, the art does not teach methods whereby the polymeric products resulting from this reaction can be produced in desired and predetermined ratios from raw materials which are readily available.

Accordingly, a clear need remains in the art for processes and products which satisfy these deficiencies.

SUMMARY OF THE INVENTION

It is accordingly one object of the present invention to provide fertilizers approaching total plant food values which overcome or otherwise mitigate the problems of the prior art.

A further object of the invention is to provide phosphate fertilizers in which the water solubility can be predetermined and controlled so as to provide nutrients for plants over extended periods of time.

A still further object of the invention is to provide processes for the production of such phosphate fertilizers and methods for control of their water solubility wherein the products are produced by the reaction of potassium dihydrogen phosphate and potassium monohydrogen phosphate.

A still further object of the invention is to provide methods for production of intermediate products from which these fertilizers may be derived.

Further objects and advantages of the present invention will become apparent as the description thereof proceeds.

In satisfaction of the foregoing objects and advantages, there is provided by the present invention phosphate fertilizer products in which water solubilities and molecular weights can be controlled and predetermined, which products comprise polymeric materials resulting from the reaction of potassium dihydrogen phosphate and potassium monohydrogen phosphate in the temperature range of 250 to 850° C. The polymeric materials resulting from this reaction are believed to comprise potassium tripolyphosphate, $K_5P_3O_{10}$, and a new potassium polyphosphate having the chemical and physical properties set forth hereinafter.

Also provided is a process for producing these products which generally comprises mixing potassium dihydrogen phosphate and potassium monohydrogen phosphate in the desired ratios, heating the mixture in the temperature range of 250° to 850° C. and recovering the products formed therefrom. The mixtures of potassium dihydrogen phosphate and potassium monohydrogen phosphate may also be produced according to this invention in predetermined ratios from raw materials by reaction of phosphate rock or similar equivalently reacting derivatives thereof with phosphoric acid or mixtures of phosphoric acid and sulfuric acid and potassium bisulfate and/or potassium sulfate while reducing the normal requirements of acid for the solubilization of phosphate rock. The mixture may then be heated as above to obtain the final products.

Also provided by this invention are procedures for use of the controlled solubility products as fertilizer materials.

DESCRIPTION OF THE DRAWINGS

Reference is now made to the drawing accompanying this application wherein FIG. 1 presents a plot of X-ray diffraction data versus molar ratios; FIG. 2 shows plots of intrinsic viscosity versus molar ratios and polymer chain length versus molar ratios; and FIG. 3 is a plot of percent water solubility versus mole percent $K_2HPO_4$.

DESCRIPTION OF THE PREFERRED EMBODIMENTS

As indicated above, the present invention provides procedures for the production of polymeric potassium phosphate materials containing essentially 100% plant nutrient values in which water solubilities and molecular weights can be controlled as desired so as to provide a plant food having any desired predetermined properties. These products are generally produced by the reaction of potassium dihydrogen phosphate and potassium monohydrogen phosphate in the temperature range of about 250 to 850° C. In a preferred embodiment, the phosphates are reacted in a ratio of about 4:2 to 50:2 as the most valuable fertilizer products are obtained employing these ratios of reactants.

The polymeric phosphate materials resulting from this reaction are believed to contain potassium tripolyphosphate and a new form of potassium polyphosphate with the molecular weight and water solubility of the polymer being dependent upon the ratio of potassium tripolyphosphate and the new potassium polyphosphate contained in the reaction product. As indicated above, these component ratios can be accurately controlled thus providing means by which the water solubilities can also be controlled.

As pointed out above, the potassium tripolyphosphate is an expected product in this reaction in view of the disclosures set forth in the article by Osterheld and Audrieth discussed above. However the new potassium polyphosphate obtained is a heretofore undisclosed material which, together with the new potassium tripolyphosphate formed in the method described hereinafter, gives rise to a new and useful fertilizer composition approaching total plant food values which is useful over extended periods.

As a result of applicants' study of the new intermediate polyphosphate product, it is characterized herein as being a compound having a variable hydrolysis rate or variable solubility in water, this variance in solubility being dependent on the ratio of the initial reactants $KH_2PO_4$ to $K_2HPO_4$. This variance in water solubility or hydrolysis rate is particularly important and supports the view that the compound is novel in view of the teaching on page 38 of the above noted article by Osterheld and Audrieth that potassium metaphosphate is insoluble in water. Studies of this polyphosphate and the resulting polymeric phosphate mixtures by X-ray analysis, viscosity studies and end group titration also support the view that the products of this invention are novel.

To better understand these distinctions, reference must be made to the properties of the total polymeric material and the manner in which it is made. In this aspect, it will be seen that the solubility of the new potassium polyphosphate of this invention is different from potassium metaphosphate which is prepared from only potassium dihydrogen phosphate and further that the compositional structure of the new potassium polyphosphate and thus the solubility, changes with the ratio of potassium dihydrogen phosphate to potassium monohydrogen phosphate employed in preparation of the polymers.

In this preparative reaction, the essential reactants are heated to a temperature in the range of 250 to 850° C. according to the following equation:

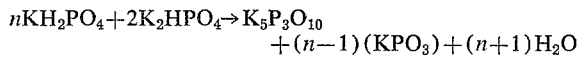

wherein $n$ preferably is an integer of at least 3, $K_5P_3O_{10}$ is potassium tripolyphosphate and the new polyphosphate is designated as $(KPO_3)$ as the actual compositional structure of the latter is not as yet known.

In conducting this reaction in a batch method, dried $KH_2PO_4$ and $K_2HPO_4$ in the require ratios are intimately admixed and heated to a temperature of about 250 to 850° C. at the rate of about 70° C. per hour. The temperature is then held at, for example, about 500° C. for about two hours and thereafter allowed to cool. During the reaction, the water formed is removed, with the amount of water removed being dependent on the value of $n$ where $n$ represents molar quantity. This is illustrated in the above equation.

The resulting polymeric materials were found not to be mere physical mixtures of potassium metaphosphate and tetrapotassium pyrophosphate, mixtures of potassium tripolyphosphate and potassium metaphosphate, nor mixtures of the starting materials $KH_2PO_4$ and $K_2HPO_4$. Unexpectedly, as indicated above, the polymers were found to contain potassium tripolyphosphate and the new potassium polyphosphate having variable solubility and molecular weight. This conclusion was reached in view of the fact that the compositional structure of the new potassium polyphosphate in the polymers changed with the molar value of $n$, the molar ratio of $KH_2PO_4$ to $K_2HPO_4$, particularly in the region where $n$ is equal to about 3 to 20 in the equation set forth hereinabove. Moreover the water-solubility of the polymers also changed with $n$, presumably due to the ratio of potassium tripolyphosphate to the new potassium polyphosphate in the different polymers. As the compositional structure of the polymer or new polyphosphate changes with $n$, the new material cannot as yet be described by precise chemical formula.

To understand and illustrate the nature of the compositions obtained as a result of the reaction however, the following determinations and comparisons were made which clearly illustrate that the novel products differ from those known in the art. In the following determinations, potassium tripolyphosphate is referred to as KTP; known potassium metaphosphate is referred to as KMP and the new potassium polyphosphate intermediate is referred to as KAP. The material designated KAP stands for potassium anhydrophosphate, by which term applicants prefer to designate the new product.

Osterheld and Audrieth supra. studied the polymerization of $nKH_2PO_4+2K_2HPO_4$ for values of $n$ equal to 1, 2 and 4. The ratio of $nKH_2PO_4$ to $2K_2HPO_4$ may hereinafter be abbreviated $nK/2K_2$. They proposed a two-step mechanism for the polymerization reaction as follows:

For $n=1$ (1)  $KH_2PO_4+2K_2HPO_4 \rightarrow K_3HP_2O_7+H_2O+K_2HPO_4$ (2)  $K_3HP_2O_7+K_2HPO_4 \rightarrow K_5P_3O_{10}+H_2O$ For $n=2$ (1)  $2KH_2PO_4+2K_2HPO_4 \rightarrow 2K_3HP_2O_7+2H_2O$ (2)  $2K_3HP_2O_7 \rightarrow H_2O+(K_6P_4O_{13}) \rightarrow K_5P_3O_{10}+KPO_3$ For $n=4$ (1)

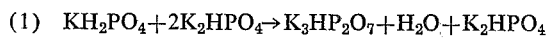

(2)

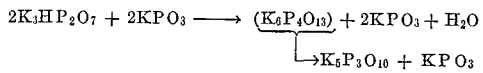

That is, they maintain that $K_5P_3O_{10}$ (KTP), potassium tripolyphosphate, is formed when the moles of $KH_2PO_4$ are less than the moles of $K_2HPO_4$ ($n=1$). When the moles of $KH_2PO_4$ are equal ($n=2$), 1 mole of KMP and 1 mole of KTP are formed; when $KH_2PO_4$ is in excess of $K_2HPO_4$ (e.g. $n=4$), 1 mole of KTP and additional moles of KMP are formed. Assuming this mechanism, the following table is presented which gives the calculated composition of mixtures for various values of $nK/2K_2$.

TABLE I

| Mole ratio, $nK/2K_2$: | Mole composition | Wt. fraction of KTP | Moles $H_2O$ removed |
|---|---|---|---|
| 1/2 | KTP | 1.000 | 2 |
| 2/2 | KTP+KPO_3 | 0.791 | 3 |
| 4/2 | KTP+3KPO_3 | 0.558 | 5 |
| 10/2 | KTP+9KPO_3 | 0.296 | 11 |
| 20/2 | KTP+19KPO_3 | 0.166 | 21 |
| 40/2 | KTP+39KPO_3 | 0.088 | 41 |

Upon examining the X-ray diffraction patterns of the polymers prepared according to the present invention, the following phases were found to be present in the polymers: $(KPO_3)_n$, $K_5P_3O_{10}$, $K_5P_3O_{10} \cdot 2H_2O$ ($\alpha$-phase). From this X-ray data, we calculated the composition of each polyphosphate by the following equations using the intensity ratios:

$$\frac{X_{KTP \cdot H_2O}}{X_{KMP}} = \frac{I_{16.1}}{I_{26.4}} \left[ \frac{I_{26.4} \cdot \mu_{KMP}}{I_{16.1} \cdot \mu_{KTP \cdot H_2O}} \right]$$

and $$\frac{X_{KTP}}{X_{KMP}} = \frac{I_{30.2}}{I_{26.4}} \left[ \frac{I_{26.4} \cdot \mu_{KMP}}{I_{30.2} \cdot \mu_{KTP}} \right]$$

also, $$X_{KTP \cdot H_2O} + X_{KMP} + X_{KTP} = 1.0$$

where $I_{16.1}$=Intensity of peak in counts per second for $K_5P_3O_{10} \cdot 2H_2O$ at $2\theta=16.1°$
$I_{30.6}$=Intensity of peak in counts per second for $K_5P_3O_{10}$ at $2\theta=30.6°$
$I_{26.4}$=Intensity of peak in counts per second for $KPO_3$ at $2\theta=26.4$
$\mu_{KTP \cdot H_2O}$=Mass absorption coefficient of $K_5P_3O_{10} \cdot 2H_2O$
$\mu_{KTP}$=Mass absorption coefficient of $K_5P_3O_{10}$
$\mu_{KMP}$=Mass absorption coefficient of $KPO_3$
$X_{KTP \cdot H_2O}$=Weight fraction of $K_5P_3O_{10} \cdot 2H_2O$
$X_{KTP}$=Weight fraction of $K_5P_3O_{10}$
$X_{KMP}$=Weight fraction of $KPO_3$ The advantages of using ratio of intensities for this calculation are that errors in experimental technique are cancelled out and the mass absorption coefficient of the mixture is cancelled out of the above expression.

Employing these concepts, the compositions of the polyphosphate polymers at various values of $nK/2K_2$, as measured by X-ray diffraction, and as calculated by assuming the reaction mechanism of Osterheld and Audrieth, were determined and the results thereof are set forth in Table II following.

In Table II, it is to be noted that the total KTP determined to be present in the polymer mixture (column 5) and the amount calculated (column 6) are in general agreement. Certainly from this table it can be said that the composition with respect to the KTP component, as measured by X-ray diffraction and as calculated by assuming the mechanism of Osterheld and Audrieth, is well within the accuracy of X-ray diffraction analysis.

Further, Table II shows the amount of the new KAP obtained in the mixture when $nKH_2PO_4+2KH_2PO_4$ are heated at 250° to 850° with water removal and that the amount of KTP in the mixture can be predicted using the reaction mechanism proposed by Osterheld and Audrieth. Moreover, whereas Osterheld and Audrieth state that the remainder of the mixture is KMP, the evidence presented herein clearly shows that the remaining component of the mixture is actually the new KAP product of this invention which has varying molecular weight and hydrolysis rate depending on the ratio of initial reactants.

TABLE II

| $nK/2K_2$ | Weight fraction of component in polymer as determined by X-ray diffraction | | | | Wt. fractions calculated from mechanism, total KTP |
|---|---|---|---|---|---|
| | KAP | $K_5P_3O_{10}\cdot 2H_2O$ | $K_5P_3O_{10}$ | Total KTP | |
| 1/2 | 0.14 | 0.19 | 0.67 | 0.86 | 1.000 |
| 1/2 | 0.10 | 0.05 | 0.85 | 0.90 | |
| 2/2 | 0.22 | 0.18 | 0.60 | 0.78 | 0.791 |
| 2/2 | 0.26 | 0.74 | | 0.74 | |
| 4/2 | 0.40 | 0.12 | 0.48 | 0.60 | 0.558 |
| 5/2 | 0.39 | 0.49 | 0.12 | 0.61 | |
| 6/2 | 0.41 | 0.10 | 0.49 | 0.59 | |
| 10/2 | 0.64 | 0.36 | | 0.36 | 0.296 |
| 20/2 | 0.85 | 0.09 | 0.06 | 0.15 | 0.166 |

To complete this determination, however, and accurately define the nature of the polymer, it was also necessary to know if the KAP in the polymer mixture was the same as potassium metaphosphate (KMP) which can be prepared from pure $KH_2PO_4$ and which was stated to be obtained by Osterheld and Audrieth, and if the nature of the KAP in the polymer varied with the relative values of $nK/2K_2$.

This determination was carried out by use of X-ray diffraction analysis, end group titration to measure the average chain length and by use of viscosity measurements. To conduct these determinations, mixtures of potassium tri-polyphosphate (KTP) and the new potassium anhydrophosphate (KAP) were prepared which corresponded to the desired $P_2O_5/K_2O$ weight ratio values of the polymeric mixture. Then the KTP was dissolved out of the polymeric mixture with ice water to provide the KAP from which the following determinations were made.

In the first determination, X-ray diffraction analysis of the KAP was obtained. In this operation, the KAP samples were dried and filtered through a 200 mesh screen. The filtered samples were then lightly packed in the sample holders to minimize preferred orientation. Three independent diffraction analyses were then made using the Norelco Diffractometer with scanning goniometer and rotating specimen holder.

In Table III following the diffraction patterns for the different KAP samples are set forth. In the table, it will be observed that $2\theta$ is the same for all the samples but that I (intensity) varies as does $nK/2K_2$. This table is set forth below where $I/I$ max. represents an average of three runs.

TABLE III.—X-RAY DEFRACTION DATA FOR KAP

| | | $I/I$ max. | | | | | |
|---|---|---|---|---|---|---|---|
| | | | | $nK/2K_2$ | | | |
| KMP | $2\theta$ | 4/2 | 5/2 | 6/2 | 10/2 | 20/2 | 40/2 |
| 18 | 14.14 | 70 | 47 | 81 | 65 | 40 | 27 |
| 7 | 16.94 | 13 | 13 | 12 | 12 | 11 | 11 |
| 15 | 17.54 | 22 | 28 | 26 | 26 | 22 | 20 |
| 10 | 19.68 | 27 | 24 | 31 | 26 | 18 | 16 |
| 15 | 23.72 | 22 | 22 | 21 | 23 | 20 | 21 |
| 6 | 24.18 | 4 | 4 | 3 | 6 | 6 | 6 |
| 73 | 25.90 | 100 | 100 | 96 | 100 | 95 | 871 |
| 100 | 26.38 | 61 | 69 | 59 | 84 | 100 | 100 |
| 17 | 27.10 | 37 | 40 | 43 | 38 | 30 | 26 |
| 27 | 28.38 | 72 | 72 | 100 | 83 | 56 | 41 |
| 12 | 28.90 | 22 | 21 | 21 | 21 | 18 | 16 |
| 2 | 30.80 | 3 | 2 | 2 | 2 | 3 | 3 |
| 16 | 31.64 | 22 | 23 | 24 | 24 | 23 | 21 |
| 35 | 32.58 | 25 | 32 | 27 | 36 | 42 | 41 |
| 20 | 33.40 | 56 | 54 | 67 | 57 | 42 | 33 |
| 17 | 34.66 | 14 | 18 | 17 | 23 | 22 | 21 |
| 4 | 37.70 | 4 | 3 | 3 | 5 | 6 | 5 |
| 66 | 39.64 | 39 | 45 | 46 | 63 | 66 | 61 |
| 55 | 39.74 | 57 | 55 | 61 | 71 | 62 | 57 |
| 30 | 40.7 | 25 | 32 | 30 | 36 | 41 | 38 |

The X-ray diffraction data for the different samples of KAP given in Table III is further interpreted and summarized in Table IV following in which Table IV following in which $\dfrac{(I/I \text{ max.})_{nK/2K_2}}{(I/I \text{ max.})_{KPO_3}}$ for the different KAP samples are listed. This table is as follows:

TABLE IV $[(I/I \text{ max})_{nK/2K_2}/(I/I \text{ max})_{KPO_3}]$

| Angle (2 theta) | $4K/2K_2$ | $5K/2K_2$ | $6K/2K_2$ | $10K/2K_2$ | $20K/2K_2$ | $40K/2K_2$ |
|---|---|---|---|---|---|---|
| 14.14 | 3.89 | 2.61 | 4.50 | 3.61 | 2.22 | 1.50 |
| 16.94 | 1.86 | 1.86 | 1.71 | 1.71 | 1.57 | 1.57 |
| 17.54 | 1.47 | 1.87 | 1.73 | 1.73 | 1.47 | 1.33 |
| 19.68 | 2.70 | 2.40 | 3.10 | 2.60 | 1.80 | 1.60 |
| 23.72 | 1.47 | 1.47 | 1.40 | 1.53 | 1.33 | 1.40 |
| 24.18 | 0.67 | 0.67 | 0.50 | 1.00 | 1.00 | 1.00 |
| 25.90 | 1.37 | 1.37 | 1.32 | 1.37 | 1.30 | 1.19 |
| 26.38 | 0.61 | 0.69 | 0.59 | 0.84 | 1.00 | 1.00 |
| 27.10 | 2.18 | 2.35 | 2.53 | 2.24 | 1.76 | 1.53 |
| 28.38 | 2.67 | 2.67 | 3.70 | 3.07 | 2.07 | 1.52 |
| 28.90 | 1.83 | 1.75 | 1.75 | 1.75 | 1.50 | 1.33 |
| 30.80 | 1.50 | 1.00 | 1.00 | 1.00 | 1.50 | 1.50 |
| 31.64 | 1.37 | 1.44 | 1.50 | 1.50 | 1.44 | 1.31 |
| 32.58 | 0.71 | 0.91 | 0.77 | 1.03 | 1.20 | 1.17 |
| 33.40 | 2.80 | 2.70 | 3.35 | 2.85 | 2.10 | 1.65 |
| 34.66 | 0.82 | 1.06 | 1.00 | 1.35 | 1.29 | 1.24 |
| 37.70 | 1.00 | 0.75 | 0.75 | 1.25 | 1.50 | 1.25 |
| 39.64 | 0.59 | 0.68 | 0.70 | 0.95 | 1.00 | 0.92 |
| 39.74 | 1.04 | 1.00 | 1.11 | 1.29 | 1.13 | 1.04 |
| 40.70 | 0.83 | 1.07 | 1.00 | 1.20 | 1.37 | 1.27 |

In Table IV it is to be observed that if all the KAP were the same and identical to known potassium metaphosphate, all the values in the table would be 1.00. This of course is not the case, thus illustrating clearly that the novel KAP is not merely potassium metaphosphate.

It was also pointed out above however, that the compositional structure of the new KAP varies or changes with the ratio of the KAP to KTP contained in the mixture. This variance is illustrated in accompanying FIG. 1 of the drawing. In this drawing a plot of the intensities $I_{14.1}/I_{26.4}$ versus the varying values of $nK/2K_2$ is shown. In this plot it is to be seen that peaks are apparent in the curve at $nK/2K_2$ values of 5/2 and 6/2. Also from $nK/2K_2$ value of 6/2 to the limiting value of $\infty/2$, a smooth curve resulted. Thus the curve of FIG. 1 shows a definite difference in the compositional structure of the KAP as the values of $nK/2K_2$ change.

To further substantiate the conclusion that KAP is not merely KMP, end group titrations were carried out to measure the average chain length, the average chain length of the polymer being designated $\overline{N}$. In this determination, KAP samples obtained as above were brought into solution by use of an acid ion exchange resin, namely Amberlite IR-12OH. The resulting solution was then titrated at 75°–78° F. over a 5–10 minute period to minimize hydrolysis of the acid solution. The samples were titrated to 5.0 using 0.1 N NaOH, and to 7.0 and 9.0 with 0.01 N NaOH. As the titration proceeded, pH readings were made.

According to theory, straight chain polyphosphates have three inflection points on pH vol curves, one inflection at ~5 which is due to a strong acid site; one at ~7.0 and another at ~9.0 which are due to weak acid sites. Such pH-vol. curves are well known in the art. As it is known from such prior art pH-volume curves that there are three inflection points in straight chain polyphosphates, it can be concluded that KAP also has straight chains as there are three inflection points shown therein.

To better find the inflection points at ~5.0 to ~7.0 however, the data obtained from the end point titrations were fit to curves. Second derivatives were then taken on the equations and replotted. The inflection points were taken where the curves cross the abscissa. Then by the following formula where $\overline{N}$ represents chain length.

$$\overline{N} = \frac{20(cc's \text{ of } 0.1 \text{ N to } 5)}{2(cc's \text{ of } 0.1 \text{ N to } 9 - cc's \text{ of } 0.01 \text{ N to } 7)}$$

the approximate chain lengths of the polymers could be calculated. This formula then gives the value of the chain length ($\overline{N}$) of the polymeric KAP at each inflection point.

The results obtained from the end point titration are plotted in the graph set forth in accompanying FIG. 2 wherein it will be seen that the chain length values $\overline{N}$ are plotted versus the $nK/2K_2$ values to indicate how the chain length varies depending on the ratio of the KAP contained in the mixture. In this regard, it is to be noted in FIG. 2 that there is a definite variation in chain length with the ratio of $nK/2K_2$. It will also be noted that the value of the chain length versus the ratio of reactants is almost a mirror image of the curve obtained when the relative intensities are plotted versus the $nK/2K_2$ values.

It is clear therefore that the above data and that shown in the graph in FIG. 2, clearly illustrate that the potassium anhydrophosphate intermediate (KAP) contains straight polymer chains and further indicates that the compositional structure of the KAP varies with the ratio $nK/2K_2$. This is further evidence therefore that KAP is not merely the potassium metaphosphate known to the art.

To further determine the properties of the new intermediate KAP, viscosity measurements were also undertaken, the viscosity measurements being obtained by solubilizing the KAP examples obtained as above in Amberlite IR-120 which is a sodium salt ion exchange resin. The solution was obtained at 20° C. and the resulting neutral or alkaline solutions were not succeptible to hydrolysis. It is of interest in this regard with respect to the KAP solutions that pure potassium metaphosphate could not be solubilized in the ion exchange resin in the same manner as the KAP which points up a further distinction between the two compounds.

These viscosity measurements were made at four concentrations and nitrinsic viscosities $(\eta)$ were calculated by ploting log $N_{rel}$ versus the concentration and extrapolating to infinite dilution. As intrinsic viscosity is a measure of molecular weight, the intrinsc viscosity is then plotted versus the ratio $nK/2K_2$ in order to determine how the intrinsic viscosity varies with the ratio of ingredients. In FIG. 2 accompanying this application, these values are plotted and the curve as shown therein should be noted. It will be seen that this curve is quite similar to that discussed above with respect to the chain length of the polymeric product values of $nK/2K_2$ up to about 20:2 and from 20:2 to 40:2 decreases whereas the chain length $\overline{N}$ increases.

It is clear therefore that these viscosity measurements point out a further property of the KAP intermediate and its relation to the amount of KAP contained in the mixture.

In a further study of the viscosity measurements, a summary table (Table V) is presented to show the summary of the viscosities at different concentrations for the mixture and the average chain length for the different polymers. This table is as follows:

TABLE V.—SUMMARY

[Viscosity $(\eta)$ and average chain length $(\overline{N})$]

| $nK/2K_2$ | | | | | | $(\eta)$ | $\overline{N}$ by end group titration |
|---|---|---|---|---|---|---|---|
| 4/2 | Conc., wt. percent | .2 | .5 | .8 | 1.0 | 1.098 | 355±10 |
|  | Time, seconds | 831 | 1,189 | 1,500 | 1,800 |  |  |
|  | $\eta$/Rel | 14.6 | 20.8 | 27.1 | 31.5 |  |  |
| 5/2 | Conc., wt. percent | .2 | .5 | .8 | 1.0 | .860 | 270±15 |
|  | Time, seconds | 466 | 647 | 801 | 933 |  |  |
|  | $\eta$/Rel | 8.2 | 11.3 | 14.0 | 16.0 |  |  |
| 6/2 | Conc., wt. percent | .2 | .59 | .8 | 1.0 | .880 | 265±19 |
|  | Time, seconds | 497 | 709 | 894 | 990 |  |  |
|  | $\eta$/Rel | 8.7 | 12.4 | 15.7 | 17.5 |  |  |
| 10/2 | Conc., wt. percent | .2 | .5 | .8 | 1.0 | 1.275 | 320±22 |
|  | Time, seconds | 1,318 | 1,552 | 2,318 | 2,683 |  |  |
|  | $\eta$/Rel | 23.1 | 27.2 | 40.6 | 47.0 |  |  |
| 20/2 | Conc., wt. percent | .2 | .5 | .8 | 1.0 | 1,285 | 345±24 |
|  | Time, seconds | 1,302 | 1,844 | 2,282 | 2,664 |  |  |
|  | $\eta$/Rel | 22.8 | 32.3 | 4.00 | 46.7 |  |  |
| 40/2 | Conc., wt percent | .2 | .5 | .8 | 1.0 | 1.128 | 370±15 |
|  | Time, seconds | 889 | 1,280 | 1,652 | 1,851 |  |  |
|  | $\eta$/Rel | 15.6 | 22.4 | 28.9 | 32.0 |  |  |

It will be seen from Summary Table V that the viscosity and the average chain length of the polymer clearly varies as the ratio of $nK/2K_2$ increases from 4:2 to 40:2 and that these variations are pronounced, thus providing further evidence that the viscosity and average chain length are clearly dependent upon the ratio of $nK/2K_2$ contained in the original mixture.

It can be concluded then that, as the $nK/2K_2$ varies, there is a definite change in chain length and molecular weight and structure for the KAP samples. The KAP formed during the reaction of $nKH_2PO_4+2K_2HPO_4$ is definitely different from pure $KPO_3$ prepared solely from $KH_2PO_4$.

With regard to the molecular weight aspect, it is to be observed from Table V that the average molecular weight of the polymers obtained according to this invention, as derived by the end group titration method, vary from about 20,000 to 80,000, or more particularly from about 30,00 to 45,000. This is calculated by multiplying $\overline{N}$, the chain length, by 119.1, the weight of each chain. Therefore, the polymeric products having the molecular weights set forth above represent preferred aspects of the invention.

It is therefore clear that the polymeric products obtained from the present process are distinct from mere mixtures of KTP and KMP and the new polyphosphate KAP is different from KMP since it exhibits different X-ray diffraction patterns, contains straight chains as shown by end point titration and demonstrates varying viscosities.

SOLUBILITY VARIATIONS OF THE POLYMERS

It was also pointed out above that one of the advantages of the products of the present invention resided in the variable water solubility thereof in that the solubility could be controlled or "tailor-made" to suit individual needs as a fertilizer.

Table VI following and FIG. 3 contain the observed water solubility of the polymeric phosphate materials as measured by the standard A.O.A.C. method (Official Methods of Analysis of the Association of Official Agricultural Chemists; Washington, D.C.; eighth edition, 155, pp. 8–10). In Table VI, the weight fraction of KTP, mole percent $K_2HPO_4$ and observed weight percent water solubility of the polymer product are given for various mole ratios of $nK/2K_2$ of the $KH_2PO_4$ and $K_2HPO_4$ starting material mixtures for ranges of $nK/2K_2$ from ½ to 50/2. In this table, it will be seen that the mole percent of $K_2HPO_4$ is inversely proportional to the values of $nK/2K_2$ and further that the weight percent water solubility of the polymer decreases with the increase in the ratio of $nK/2K_2$. Thus, as it has been demonstrated in the previous section in Table II that the ratio of KTP to KAP in the polymeric material is a function of $nK/2K_2$, and since KTP is more water soluble than KAP, it can be concluded that the change in solubility of the polymeric material with $nK/2K_2$ or mole percent $KH_2PO_4$ is due to the different KTP/KAP ratios in the different polymers.

In FIG. 3 of the drawings, the weight percent water solubility is plotted against the mole percent $K_2HPO_4$, these values being taken from columns three and four of Table VI. The plot of FIG. III clearly demonstrates the unexpected phenomenon that the solubility of the polymer mixture increases with an increase in the mole percent of $K_2HPO_4$ present in the original reactants, and thus illustrates that an increase in the amount of KAP contained therein is apparent.

TABLE VI

| Mole ratio, $nK/2K_2$ | Wt. fraction of KTP | Mole percent, $K_2HPO_4$ | Weight percent, water solubility of polymer observed |
|---|---|---|---|
| 1/2 | 1.000 | 66.67 | {92.0 / 87.0} |
| 2/2 | 0.791 | 50.00 | 76.0 |
| 4/2 | 0.558 | 33.33 | 52.5 |
| 6/2 | | 25.00 | {41.0 / 48.8} |
| 10/2 | 0.296 | 16.60 | {29.6 / 36.1} |
| 20/2 | 0.166 | 9.09 | 22.0 |
| 50/2 | | 3.85 | 8.8 |

It is therefore concluded that the polyphosphate polymers formed by reacting $nKH_2PO_4+2K_2HPO_4$ at 250 to 850° C. are mixtures of KTP and KAP. The amount of KTP in the mixtures can be predicted from the reaction mechanism of Osterheld and Audrieth. The KAP in the polymers is not the same as pure KMP prepared from only $KH_2PO_4$, and the compositional structure of the KAP changed with $nK/2K_2$ (or percent $K_2HPO_4$) was due to the ratio of KTP to KAP in the polymers. It is thus evident that the products are novel compositions of matter and that the KAP is per se novel.

To illustrate the precise nature and properties of the polymeric products of this invention, the following Table VII is presented which shows experiments carried out to produce the products of the invention. These experiments were conducted by mixing the $KH_2PO_4$ and $K_2HPO_4$ in the stated ratios and reacting the mixture at about 500° C. according to the method described hereinabove.

TABLE VII.—CONTROLLED MOLECULAR WEIGHT AND WATER SOLUBILITY OF POTASSIUM POLYPHOSPHATES

| | Theoretical calculated values | | | | | | Reactants | | Experimentally determined values | | | |
|---|---|---|---|---|---|---|---|---|---|---|---|---|
| | $KH_2PO_4/K_2HPO_4$ ratio | | $P_2O_5/K_2O$ ratio | | Moles $H_2O$ loss (e) | Percent $H_2O$ loss (f) | Weight in grams | | Percent $H_2O$ loss (i) | $H_2O$ loss, percent of theory (j) | Percent water solubility | |
| Ex. | Molar (a) | Weight (b) | Moles (c) | Wt. percent (d) | | | $KH_2PO_4$ (g) | $K_2HPO_4$ (h) | | | As $P_2O_5$ (k) | As K poly (l) |
| 1 | 0/2 | | 1/2 | 43.0/57.0 | 1 | 5.17 | 0.0 | 25.00 | 7.60 | 147 | 42.08 | 97.8 |
| 2 | 1/4 | 0.195/1 | 5/9 | 45.6/54.4 | 1.5 | 6.30 | 4.08 | 20.92 | | | | |
| 3 | 1/2 | 0.39/1 | 3/5 | 47.5/52.5 | 2 | 7.43 | 7.03 | 17.97 | 9.92 | 134 | 41.34 | 87.0 |
| 4 | 2/2 | 0.78/1 | 2/3 | 50.1/49.9 | 3 | 8.69 | 10.96 | 14.04 | | | | |
| 5 | 4/2 | 1.56/1 | 3/4 | 53.0/47.0 | 5 | 10.07 | 15.24 | 9.76 | | | | |
| 6 | 6/2 | 2.34/1 | 4/5 | 54.7/45.3 | 7 | 10.80 | 17.51 | 7.49 | 11.68 | 108 | 26.72 | 48.8 |
| 7 | 10/2 | 3.91/1 | 6/7 | 56.3/43.7 | 11 | 11.59 | 19.91 | 5.09 | 11.68 | 101 | 20.34 | 36.1 |
| 8 | 20/2 | 7.80/1 | 11/12 | 58.0/42.0 | 21 | 12.31 | 22.16 | 2.84 | 12.68 | 103 | 12.74 | 22.0 |
| 9 | 50/2 | 19.5/1 | 26/27 | 59.2/40.8 | 51 | 12.80 | 23.78 | 1.22 | 12.57 | 98 | 5.20 | 8.8 |
| 10 | 100/2 | 39.0/1 | 51/52 | 59.6/40.4 | 101 | 13.02 | 24.375 | 0.625 | 16.35 | 125 | 3.64 | 6.1 |
| 11 | 200/2 | 77.1/1 | 101/102 | 59.9/40.1 | 201 | 13.11 | 24.68 | 0.32 | 12.86 | 98 | 2.71 | 4.5 |
| 12 | X/0 | | 1/1 | 60.2/39.8 | X | 13.22 | 25.00 | 0.0 | 12.87 | 97 | 2.10 | 3.5 |

NOTE.—Column (k) represents the determined percent $P_2O_5$ soluble in water as determined by the standard A.O.A.C. test. Solubility of the potassium polyphosphate is calculated in column (l) by dividing the determined water soluble percent $P_2O_5$ by the theoretical $P_2O_5$ content found in column (d). For example, the 42.08% soluble $P_2O_5$ found in Example 1 divided by 0.43 found in column (d) becomes the water solubility (97.8%) of $KO(KPO_3)_2K$; in reality tetrapotassium pyrophosphate $K_4P_2O_7$.

In Table VII, it will be observed that twelve working examples are presented wherein molar ratios of $KH_2PO_4/K_2HPO_4$ ranging from 0:2 to infinity:0 were used. The table enumerates the reactants employed, the theoretical calculated values and the experimentally calculated values. As was explained hereinabove, water is expelled during the reaction and both the calculated percent water loss, column (f), and the actual percent water loss, column (i), are given in the table. With regard to the latter, it will be seen by a comparison of column (i) with column (f) that the two values are within the range of experimental error and thus the theory relative to the solubility of the product can be predetermined prior to conducting the reaction.

It is also to be observed from columns (k) and (l) that the water solubility calculated as either $P_2O_5$ or K Poly, decreases as the ratio of $KH_2PO_4/K_2HPO_4$ increases which further supports the theory set forth hereinabove that solubility of the final products may be varied at will by a proper use of original molar ratios of the reactants.

As may be observed from column (d) of this table, products having plant food values ranging from about 0-43-57 to 0-60-40 (N-P-K) may be obtained with the products of the invention using the concepts set forth hereinafter. Further, these ratios may be predetermined and varied as desired to fit the consumers needs for optimum fertilizer solubility by merely varying the ratios of the starting materials. In addition the molecular weight values can also be predetermined.

The data of Table VII should also be considered in conjunction with Table II and FIG. 3 by which the water solubility of the polymeric mixture can be readily predetermined prior to conducting the reaction. Therefore, by utilization of the techniques described hereinabove, fertilizer products approaching 100% $P_2O_5$ and $K_2O$ plant food values may be produced with the desired solubility molecular weight and $P_2O_5/K_2O$ ratio. The benefits obtainable by use of such fertilizer technology is clearly obvious especially for areas of variable rainfall and where plants require nutrients over extended periods of time.

In a further advantageous aspect of the present invention, there are also provided methods for the production of the mixtures of potassium dihydrogen phosphate and potassium monohydrogen phosphate in the desired ratios from basic and readily available raw materials.

It is known in the art from Indian Patent No. 49,178 that mixed phosphates may be produced by the reaction of tricalcium phosphate with mixtures of sulfuric acid and acid sulfates of sodium, potassium and ammonium according to the following equations.

$$Ca_3(PO_4)_2 + 3RHSO_4 \rightarrow 3CaSO_4 + R_2HPO_4 + RH_2PO_4$$
$$Ca_3(PO_4)_2 + 4RHSO_4 \rightarrow 3CaSO_4 + 2RH_2PO_4 + R_2SO_4$$

wherein R may be potassium, sodium or ammonium. This patent does not teach that acids other than sulfuric acid may be used in this reaction with more advantageous results or that the ratio of the $R_2HPO_4$ and $RH_2PO_4$ products obtained may be controlled by the choice of reactants. Furthermore, there is no disclosure in the patent for producing a wide range of potassium polyphosphates directly from phosphate rock and/or its partially or completely solubilized derivatives and other readily available raw materials.

Contrary to expectations, it has been discovered that a novel and wide range of desirable potassium polyphosphates may be produced directly from phosphate rock, and/or the partially and completely solubilized forms thereof, by the action thereon of phosphoric acid or mixtures of phosphoric acid and sulfuric acid in the presence of potassium bisulfate and/or potassium sulfate.

In general, this process comprises the reaction of phosphate rock, $Ca_9(PO_4)_6 \cdot CaF_2$, equivalent raw materials and/or solubilized forms thereof with potassium bisulfate and/or potassium sulfate together with phosphoric acid or mixtures of phosphoric acid and sulfuric acid to produce a mixture of potassium dihydrogen phosphate and potassium monohydrogen phosphate, and side products such as calcium sulfate and hydrogen fluoride when phosphate rock is employed as the starting material. Solubilized forms of phosphate rock which may be used in this reaction include partially and/or completely solubilized phosphoric acid reaction products thereof including calcium forms such as triple super phosphate, $Ca(H_2PO_4)_2$, normal super phosphate, dibasic calcium phosphate, $CaHPO_4$ and the like. All of these compounds and their methods of preparation from phosphate rock are well known in the art.

In the process where phosphate rock, phosphoric acid, and potassium sulfate are the reactants, the reaction may be described by the following general equation:

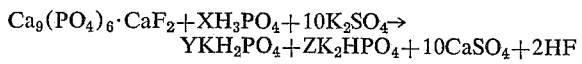

wherein X represents the moles of acid reacted and varies between 4 and 14 and Y and Z define the moles of potassium dihydrogen phosphate and potassium monohydrogen phosphate produced respectively, in the reaction. The following relationships may also be shown to exist in this reaction:

$$Y = 2X - 8$$
$$Z = 14 - X$$

and

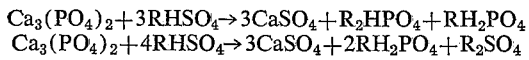

where $Z = 2$

From this equation and the data shown in Table VIII following it can be seen that the amount of acid employed will determine the ratio of the desired products. Further it will be seen from Table VIII that as X is varied, the ratio of $Y/Z$ also varies so that the moles of $KH_2PO_4$ and $K_2HPO_4$ can be easily calculated. The data for values of X and the ratios of $Y/Z$ are set forth in this table. It will be understood of course that in this reaction, that fractional moles of the phosphoric acid may be used with the remaining acid being supplied by sulfuric acid.

TABLE VIII $$Ca_9(PO_4)_6 \cdot CaF_2 + XH_3PO_4 + 10K_2SO_4 \longrightarrow YKH_2PO_4 + ZK_2HPO_4 + 10CaSO_4 + 2HF$$

Percent acid required as compared to TSP in the solubilization of phosphate rock = $(100)(2Y+Z/2)/(2Y+Z)$

| X | Y/Z | Y(Z−2) | Percent acid |
|---|-----|--------|--------------|
| 4 | 0/10 | 0 | 50.0 |
| 5 | 2/9 | 4/9 | 65.3 |
| 6 | 4/8 | 1 | 75.0 |
| 7 | 6/7 | 12/7 | 81.5 |
| 8 | 8/6 | 8/3 | 86.4 |
| 9 | 10/5 | 4 | 90.0 |
| 10 | 12/4 | 6 | 92.8 |
| 11 | 14/3 | 28/3 | 95.2 |
| 12 | 16/2 | 16 | 96.9 |
| 13 | 18/1 | 36 | 98.6 |
| 14 | 20/0 | ---- | 100.0 |

In Table VIII, it will be observed in conjunction with the general equation set forth hereinabove, that as the moles of acid employed increase from X=4 to 14, the ratio of Y to Z also increases in such manner that when X is 4, no potassium dihydrogen phosphate is produced whereas at the top of the scale when X=14, no potassium monohydrogen phosphate is produced in the reaction. As a consequence, in the intermediate levels of acid utilization, the desired ratio of $nK/2K_2$ (potassium dihydrogen phosphate:potassium monohydrogen phosphate) may be produced.

Table VII above also illustrates a further important aspect of the present invention. This embodiment represents an important commercial aspect of the process of the invention, that is, the amount of acid necessary to conduct the reaction and the savings of acid over conventional solubilization processes. In the last column of Table VIII it will be observed that the percent of acid necessary, as compared to that required to produce triple super phosphate (TSP), is set forth for each reaction. It is to be seen in this respect that as the value of X increases, the percentage of acid necessary to carry out the reaction also increases. Subtraction of the acid percentages given from 100 provide the total acid savings which may be achieved by the various reactions. This figure varies from 50% savings when X=4 to no savings when X=14.

It is to be appreciated therefore that the process operates to produce potassium polyphosphates with excellent (high) solubility characteristics from phosphate rock and/or its derivatives using less acid than is normally required for mere solubilization of the rock. Hence this represents a definite commercial advantage for the process of this invention.

15

To illustrate this reaction the following equation and example are presented which illustrate how one combination of reactants results in the production of a definite ratio of potassium dihydrogen phosphate and potassium monohydrogen phosphate. Thus in the example, the following values are used:

For $$X=6;\ Y=4;\ Z=8;\ Y/Z=4/8=[1/2]_{Z=2}$$

The equation becomes $$Ca_9(PO_4)_6 \cdot CaF_2 + 6H_3PO_4 + 10K_2SO_4 \rightarrow$$
$$4KH_2PO_4 + 8K_2HPO_4 + 10CaSO_4 + 2HF$$

Example 13.—This reaction was carried out in the following manner: 10.61 grams of 85.3% $H_3PO_4$ and 24.30 grams of water were mixed in a 300 ml. wide mouth jar, and then 26.81 grams of $K_2SO_4$ were dissolved in this acid solution. Twenty grams of finely ground 70 BPL rock phosphate were slowly added to the above mixture while stirring by hand. Then the jar was closed with a lid to which was fitted a reflux condenser and automatic stirrer. The reacting mixture was stirred at 100° C. for 24 hours.

At the end of the period the moist reaction products were ground to a pulp and divided into two aliquots. The first aliquot (1 gm.) was analyzed for total $P_2O_5$, citrate insoluble $P_2O_5$, and water soluble $P_2O_5$, $SO_4$, Ca and K. From this analysis the phosphate conversions were determined. The second aliquot (10 gms.) was further ground and mixed with 50 ml. of a dioxane-acetone mixture (50–50% by volume) to remove unreacted $H_3PO_4$. This slurry was filtered on a Buchner funnel, washed with 50 ml. of the dioxane-acetone mixture and then with 100 ml. of acetone. This organic filtrate was weighed and analyzed for $P_2O_5$. The filter cake from the above filtration was slurried with 200 ml. of water and stirred for 15 to 20 minutes to dissolve the water soluble components. This aqueous slurry was filtered on a Buchner funnel and washed with 100 ml. of water. The filtrate was then evaporated to dryness and analyzed for the above mentioned components by wet chemical methods and by X-ray diffraction analysis. The filter cake was weighed and analyzed by the same methods. The purpose of processing the second aliquot was to separate and characterize the reaction products and thereby obtain a material balance.

Table IX contains the conditions and results for this example (Example 13) and Example 14 for which the reaction temperature and the combination of acid strength and amount of water were different.

TABLE IX.—CONDITIONS AND RESULTS FOR THE POTASSIUM SULFATE REACTION

| Example No. | 13 | 14 |
|---|---|---|
| Conditions: | | |
| Time, hours | 24 | 24 |
| Temperature, °C | 100 | 65 |
| Acid strength, wt. percent | 35 | 25 |
| Free water to obtain acid strength, gms | 24.3 | 34.64 |
| Final moistures, wt. percent | 18.6 | 19.1 |
| Final pH | 3.8 | 2.8 |
| Reactants in grams: | | |
| $Ca_9(PO_4)_6 \cdot CaF_2$ | 20.0 | 20.0 |
| As Ca | 6.64 | 6.64 |
| As $P_2O_5$ | 6.55 | 6.55 |
| Impurities | 4.49 | 4.49 |
| $H_3PO_4$ | 10.61 | 10.61 |
| As $P_2O_5$ | 6.55 | 6.55 |
| $K_2SO_4$ | 26.81 | 26.81 |
| As K | 12.03 | 12.03 |
| As $SO_4$ | 14.78 | 14.78 |
| Water soluble products in grams: | | |
| As $P_2O_5$ | 9.42 | 9.94 |
| As $SO_4$ | 16.97 | 14.92 |
| As Ca | 2.66 | 2.55 |
| Available $P_2O_5$ | 11.88 | 12.79 |
| Total $P_2O_5$ | 14.11 | 14.67 |
| Percent conversion: | | |
| $P_2O_5$ to water soluble | 43.8 | 51.8 |
| $P_2O_5$ to available | 81.4 | 95.27 |
| Material balance $P_2O_5$ | 107.7 | 112.0 |
| Qualitative X-ray analysis of water soluble products in solid form | (1) | (2) |

[1] $K_2HPO_4$, $KH_2PO_4$, $K_2SO_4$.
[2] $K_2HPO_4$, $KH_2PO_4$, $K_2SO_4$, $Ca(H_2PO_4)_2$.

16

In the process where phosphate rock, phosphoric acid and potassium bisulfate are the reactants, the reaction may be described by the following general equation:

$$Ca_9(PO_4)_6 \cdot CaF_2 + X'H_3PO_4 + 10KHSO_4 \rightarrow$$
$$Y'KH_2PO_4 + Z'K_2HPO_4 + 10CaSO_4 + 2HF$$

wherein X' represents the moles of acid reacted and varies between 0 and 4, and Y' and Z' define the moles of potassium dihydrogen phosphate and potassium monohydrogen phosphate produced, respectively. The following relationships may also be shown to exist:

$$Y' = 2X' + 2$$

$$Z' = 4 - X'$$

$$\frac{nK}{2K_2} = \left[\frac{Y'}{Z'}\right]$$

where $Z'=2$

From this equation and the data in Table X following it can be seen that the amount of acid employed will determine the ratio of desired products. Thus Table X presents data for the bisulfate reaction corresponding to the sulfate reaction described above with respect to Table VIII. This table is as follows:

TABLE X.—POTASSIUM POLYPHOSPHATES $Ca_9(PO_4)_6CaF_2 + X'H_3PO_4 + 10KHSO_4 \rightarrow$
$\qquad Y'KH_2PO_4 + Z'K_2HPO_4 + 10CaSO_4 + 2HF$ where: $Y'=2X'+2$ and $Z'=4-X'$ and $nK/2K_2=(Y'/Z')\ z'_{-2}$.

Percent acid required as compared to TSP=(100)
$(2Y+Z'/2)/(2Y'+Z')$

| X' | Y'/Z' | Y'(Z'=2) | Percent acid |
|---|---|---|---|
| 4 | 10/0 | | 100.0 |
| 3 | 8/1 | 16 | 96.9 |
| 2 | 6/2 | 6 | 92.8 |
| 1 | 4/3 | 8/3 | 86.2 |
| 1/2 | 6/7 | 12/7 | 81.5 |
| 1/3 | 8/11 | 16/11 | 79.6 |
| 1/4 | 10/15 | 20/15 | 78.6 |
| 1/5 | 12/19 | 24/19 | 77.8 |
| 1/10 | 22/39 | 44/39 | 76.5 |
| 1/100 | 202/399 | 404/399 | 75.1 |
| 0 | 2/4 | 1 | 75.0 |

As with the discussion regarding Table VIII regarding the sulfate reaction, Table X illustrates how the amount of acid employed may be varied to obtain desired predetermined ratios of $KH_2PO_4$ and $K_2HPO_4$. Similarly, from column four of this table, subtraction of the percent acid from 100 gives the acid savings realized as compared with conventional solubilization reactions. Also a portion of the phosphoric acid may be replaced with sulfuric acid in this reaction.

To illustrate this reaction and support the above data the following equation and example are presented which illustrate how one combination of reactants employed results in the production of definite ratios of potassium dihydrogen phosphate and potassium monohydrogen phosphate.

For $$X'=3;\ Y'=8,\ Z'=1;\ Y/Z'=8/1=[16/2]_{z'=2}$$

$$Ca_9(PO_4)_6 \cdot CaF_2 + 3H_3PO_4 + 10KHSO_4 \rightarrow$$
$$8KH_2PO_4 + K_2HPO_4 + 10CaSO_4 + 2HF$$

Example 15.—This reaction which employs $KHSO_4$ was conducted by the following procedure: 3.41 grams of 85.3% $H_3PO_4$ and 28.60 grams of water were mixed in a 300 ml. wide mouth jar, and then 13.50 grams of $KHSO_4$ were dissolved in this acid solution. Ten grams of finely ground 70 BPL rock phosphate were slowly added to the above mixture while stirring by hand. Then the jar was closed with a lid and fitted with a reflux condenser and automatic stirrer. The reacting mixture was stirred at 100° C. for 16 hours. At the end of this period the moist products were cooled and weighed, and then enough water was added to obtain a final mixture of 10 grams of water to one gram of dry initial solids. This mixture was stirred for 15 to 20 minutes to dissolve the water soluble components. The entire slurry was filtered on a Buchner funnel and washed with water. The filtrate was allowed to stand at 0° C. for 8 to 22 hours to ensure completion of the precipitation of $CaSO_4$. This filtrate, containing some additional precipitate of $CaSO_4$ was refiltered through the original filter cake on the Buchner funnel and was washed with water. This final filter cake was dried on a steam bath, weighed, ground to ensure a homogenous material, and analyzed by wet chemical methods for total $P_2O_5$, citrate insoluble $P_2O_5$, and water soluble $P_2O_5$, $SO_4$ and K. The filtrate was decolorized by mixing with 0.1 wt. percent activated carbon and then filtering off the activated carbon. This clear filtrate was weighed and divided into two aliquots. From one aliquot samples were taken to analyze for $P_2O_5$, $SO_4$ and K. The second aliquot was evaporated to dryness on a steam bath to obtain the water soluble components in solid form which were analyzed by X-ray diffraction methods. Finally, these solid products were heated at 500° C. to produce the polymeric material which again was analyzed by X-ray diffraction methods.

Table XI following contains the conditions and results for this example (Example 15) and four other examples for which the reaction temperature, time, and/or the amount of water were varied and the results obtained from these reactions.

sired wide range of potassium polyphosphates directly from phosphate rock and/or derivatives thereof. This process is particularly advantageous, since by using the sulfates and/or bisulfates in the reaction, it eliminates the need to remove corrosive, hard to handle HCl from water-containing solids or viscous liquids which conventional processes use to produce potassium phosphates encounter, for example by the equation:

$$KCl + H_3PO_4 \rightarrow KPO_3 + HCl + H_2O$$

Further, control of the KTP/KAP ratios in the polymeric mixtures permits the process to proceed with more favorable (lower) melt viscosities thus permitting dehydration to be accomplished more readily.

A key advantage of this process however resides in the fact that the $K_2HPO_4/KH_2PO_4$ mixtures obtained can be converted directly, without isolation, into the above described KTP/KAP fertilizer products having the aforedescribed useful solubility and molecular weight characteristics. Therefore, use of this process to produce the $K_2HPO_4/KH_2PO_4$ mixtures from phosphate rock and/or derivatives thereof, in combination with the second reaction step at temperatures in the range of 250 to 850° C. results in the direct production of the fertilizer products of this invention. Thus, depending upon the precise $P_2O_5/K_2O$ ratios involved, the key potassium polyphos-

TABLE XI.—CONDITIONS AND RESULTS FOR THE POTASSIUM BISULFATE REACTION

| Reaction parameters | Example No. | | | | |
|---|---|---|---|---|---|
| | 15 | 16 | 17 | 18 | 19 |
| Conditions: | | | | | |
| Time, hours | 16 | 16 | 16 | 1 | 1 |
| Temperature, °C | 100 | 100 | 100 | 100 | 100 |
| Acid strength, wt. percent | 10 | 20 | 5.4 | 5.4 | 10 |
| Free water to obtain acid strength, gms | 28.60 | 14.05 | 53.20 | 53.2 | 28.6 |
| Final moisture, wt percent | 59.8 | 34.7 | 50 | 86.7 | 86 |
| Final pH | 1.4 | 2.7 | 2.2 | 1.7 | 1.4 |
| Reactants in grams: | | | | | |
| $Ca_9(PO_4)_6 \cdot CaF_2$ | 10 | 10 | 10 | 10 | 10 |
| As $P_2O_5$ | 3.28 | 3.28 | 3.28 | 3.28 | 3.28 |
| $H_3PO_4$ | 3.41 | 3.41 | 3.41 | 3.41 | 3.41 |
| As $P_2O_5$ | 2.11 | 2.11 | 2.11 | 2.11 | 2.11 |
| $KHSO_4$ | 13.50 | 13.50 | 13.50 | 13.50 | 13.50 |
| As K | 3.88 | 3.88 | 3.88 | 3.88 | 3.88 |
| As $SO_4$ | 9.52 | 9.52 | 9.52 | 9.52 | 9.52 |
| Water soluble products in grams: | | | | | |
| As $P_2O_5$ | 4.83 | 4.84 | 4.77 | 4.46 | 4.51 |
| As $SO_4$ | 6.65 | 6.35 | 9.09 | 6.98 | 7.17 |
| As K | 4.14 | 4.67 | 3.89 | 3.70 | 3.69 |
| Available $P_2O_5$ | 5.35 | 5.14 | 5.15 | 4.71 | 4.49 |
| Total $P_2O_5$ | 5.37 | 5.35 | 5.51 | 5.41 | 5.35 |
| Theoretical $P_2O_5/K_2O$ (wt. ratio) | 1.345 | 1.345 | 1.345 | 1.345 | 1.345 |
| Actual water soluble $P_2O_5/K_2O$ (wt. ratio) | 0.9685 | 0.8604 | 1.018 | 1.007 | 1.046 |
| Percent conversion: | | | | | |
| $P_2O_5$ to water soluble | 82.9 | 83.2 | 81.1 | 71.6 | 73.2 |
| $P_2O_5$ to available | 98.8 | 92.4 | 92.7 | 79.3 | 81.7 |
| Material balance $P_2O_5$ | 103.3 | 99.3 | 102.2 | 100.4 | 99.3 |
| Qualitative X-ray analysis of water soluble products in solid form | (1) | (1) | (2) | | |
| Qualitative X-ray analysis of polymeric materials | (3) | (4) | (5) | | |

1 $KH_2PO_4$, $K_2HPO_4$, $CaK_2(SO_4)_2 \cdot H_2O$.
2 $K_2HPO_4$, $K_2SO_4$, $CaSO_4$, $CaK_2(SO_4)_2 \cdot H_2O$.
3 KAP, $K_2HPO_4$, $K_2SO_4$.
4 KAP, KTP, $K_2HPO_4$, $KH_2PO_4$, $K_2SO_4$.
5 KAP, $K_2SO_4$.

The basic reactants employed in the processes may be readily obtained from raw materials which are also readily available. Thus the sulfate and bisulfate may be easily obtained according to known procedures by the reaction of sulfuric acid and potassium chloride, from which reactions hydrochloric acid may be recovered as a valuable by-product. The phosphate rock is of course a natural raw material and the acids are readily available.

Further, the processes are readily adaptable to continuous processes for production of the products of this invention. Thus the sulfate and acid may be mixed and then reacted with the phosphate rock or derivative thereof. These reactions may be conducted in existing equipment or plants in which multiple reactors may be used with continuous cycling of the reactants with provisions for filtration, water washes and by-product removal where necessary or desired according to known methods.

To be fully appreciated, the above described process provides a novel and economical route to produce the dephates can be produced directly by the two-step process of this invention.

Moreover, this process is readily integrated with present phosphate technology. This is not possible with some of the newer processses such as those which use nitric acid or hydrochloric acid to acidulate phosphate rock. This process is also compatible with the concept wherein the by-product gypsum formed is converted to ammonium sulphate (Chemical Week, 1–20–68, p. 64) or to sulphur and/or sulphuric acid.

In summary, it is to be understood that the controlled solubility aspects of the potassium polyphosphate products produced by the process of the invention, permit the consumer to choose between the so-called "quick-response" fertilizers and more gradual release of the plant nutrients over an extended period of time. Moreover, by mixing (as in a bulk blender) granules containing the elements of high intermediate and low potassium polyphosphate solubility, the consumer has a broad range of control over plant nutrient availability. This invention therefore provides a means for a "one-time fertilization" program.

Beyond the needs and convenience of the consumer however, the invention concept permits tailor-made products to meet the needs of any geographical area. For example, in areas where the average rainfall is high, a very soluble fertilizer material is often leached from the soil without ever being made available to the plant. Disadvantages of this type are thus obviated by the present invention.

Various changes and modifications of the invention can be made, and to the extent that such variations incorporate the spirit of this invention, they are intended to be included within the scope of the appended claims.

What is claimed is:

1. A polymeric composition of matter having a molecular weight ranging from about 20,000 to about 80,000 comprising: (1) potassium tripolyphosphate, and (2) a potassium polyphosphate designated as potassium anhydrophosphate other than potassium metaphosphate, said composition of matter being the product of the reaction of potassium dihydrogen phosphate ($KH_2PO_4$) with potassium monohydrogen phosphate ($K_2HPO_4$) at a temperature of about 250 to 850° C., the molar ratio of said potassium dihydrogen phosphate and potassium monohydrogen phosphate being expressed as $$nKH_2PO_4 + 2K_2HPO_4$$

wherein $n$ is an integer ranging from about 3 to about 100; wherein in said composition of matter the weight percent water solubility decreases with the increase in the ratio of $nKH_2PO_4$ to $2K_2HPO_4$ in the original reaction, and wherein the compositional structure of the composition changes with the ratio of $nKH_2PO_4$ to $2K_2HPO_4$ in the original reaction.

2. A composition of matter according to claim 1 wherein the intensity values, as measured by X-ray diffraction, for the potassium anhydrophosphate, change with the ratio of $nKH_2PO_4$ to $2K_2HPO_4$.

3. A composition of matter according to claim 2 wherein the chain length, as measured by end-point titration, for the potassium anhydrophosphate changes with the ratio of $nKH_2PO_4$ to $2K_2HPO_4$.

4. A composition of matter according to claim 3 wherein the intrinsic viscosity of the potassium anhydrophosphate changes with the ratio of $nKH_2PO_4$ to $2K_2HPO_4$.

5. A composition of matter according to claim 4 wherein $n$ is an integer ranging from 4 to about 50.

6. A composition of matter according to claim 5 wherein the molecular weight ranges from about 30,000 to about 45,000.

7. A composition of matter according to claim 4 wherein $n$ is an integer ranging from about 3 to 20.

8. A composition of matter according to claim 4 wherein the amount of potassium anhydrophosphate in the composition increases with the increase in value of $n$.

9. As a composition of matter, a potassium polyphosphate designated as potassium anhydrophosphate other than potassium metaphosphate and containing straight polymer chains, said composition being prepared in the reaction of potassium dihydrogen phosphate ($KH_2PO_4$) with potassium monohydrogen phosphate ($K_2HPO_4$) at a temperature of about 250° to 850° C., the molar ratios of said reactants being expressed as $nKH_2PO_4 + 2K_2HPO_4$ wherein $n$ is an integer ranging from about 3 to about 100, said potassium anhydrophosphate other than potassium metaphosphate being soluble in sodium salt ion exchange resins, the compositional structure and hydrolysis rate of said potassium anhydrophosphate other than potassium metaphosphate varying with the ratio of $nKH_2PO_4$ to $2K_2HPO_4$ in the original reaction.

10. A composition of matter according to claim 9 wherein $n$ is an integer ranging from 4 to about 50.

References Cited

UNITED STATES PATENTS

| | | | |
|---|---|---|---|
| 3,218,150 | 11/1965 | Gautier et al. | 71—51 |
| 3,233,967 | 2/1966 | Shen | 23—106A |
| 3,309,174 | 3/1967 | Pals | 23—107 |

OTHER REFERENCES

Osterheld, et al.: Journal of Physical Chemistry, "Polymerization and Depolymerization Phenomena in Phosphate-Metaphosphate Systems at High Temperatures," vol. 56, 1952, pp. 38–42.

REUBEN FRIEDMAN, Primary Examiner

C. N. HART, Assistant Examiner

U.S. Cl. X.R.

71—51; 23—106

UNITED STATES PATENT OFFICE
CERTIFICATE OF CORRECTION

Patent No. 3,600,152          Dated August 17, 1971

Inventor(s) Erhart K. Drechsel and John B. Sardisco

It is certified that error appears in the above-identified patent and that said Letters Patent are hereby corrected as shown below:

Column 2, line 34, "ploy" should be --poly--;
    Column 3, line 18, "one" should be --none--;
    Column 5, line 17, "require" should be --required--;
    Column 5, last line of equation, line 75, "$2KPO_4$"
        should be --$2KPO_3$--;
    Column 10, line 27, "nitrinsic" should be --intrinsic--;
    Column 10, Table V, 6/2, first line, ".59" should
        be --.5--;
    Column 10, Table V, 20/2, under column (n), "1,285"
        should be 1.285--;
    Column 10, Table V, 20/2, last line, "4.00" should
        be --40.0--;
    Column 11, line 12, "30,00" should be --30,000--;
    Column 12, Table VII, under (k), "41.34" should be
        --41.43--;
    Column 12, Table VII, under (l), "$97.^8$" should be --97.8--;
    Column 14, line 43, "VII" should be --VIII--;
    Column 17, Table XI, under Total $P_2O_5$, "5.37"
        should be --5.57--.

Signed and sealed this 25th day of January 1972.

(SEAL)
Attest:

EDWARD M. FLETCHER, JR.          ROBERT GOTTSCHALK
Attesting Officer          Commissioner of Patents